Aug. 20, 1940.  T. F. DOWNING, JR  2,212,265
SEPARATION OF BODIES OF DIFFERENT PHYSICAL PROPERTIES
Filed April 1, 1938
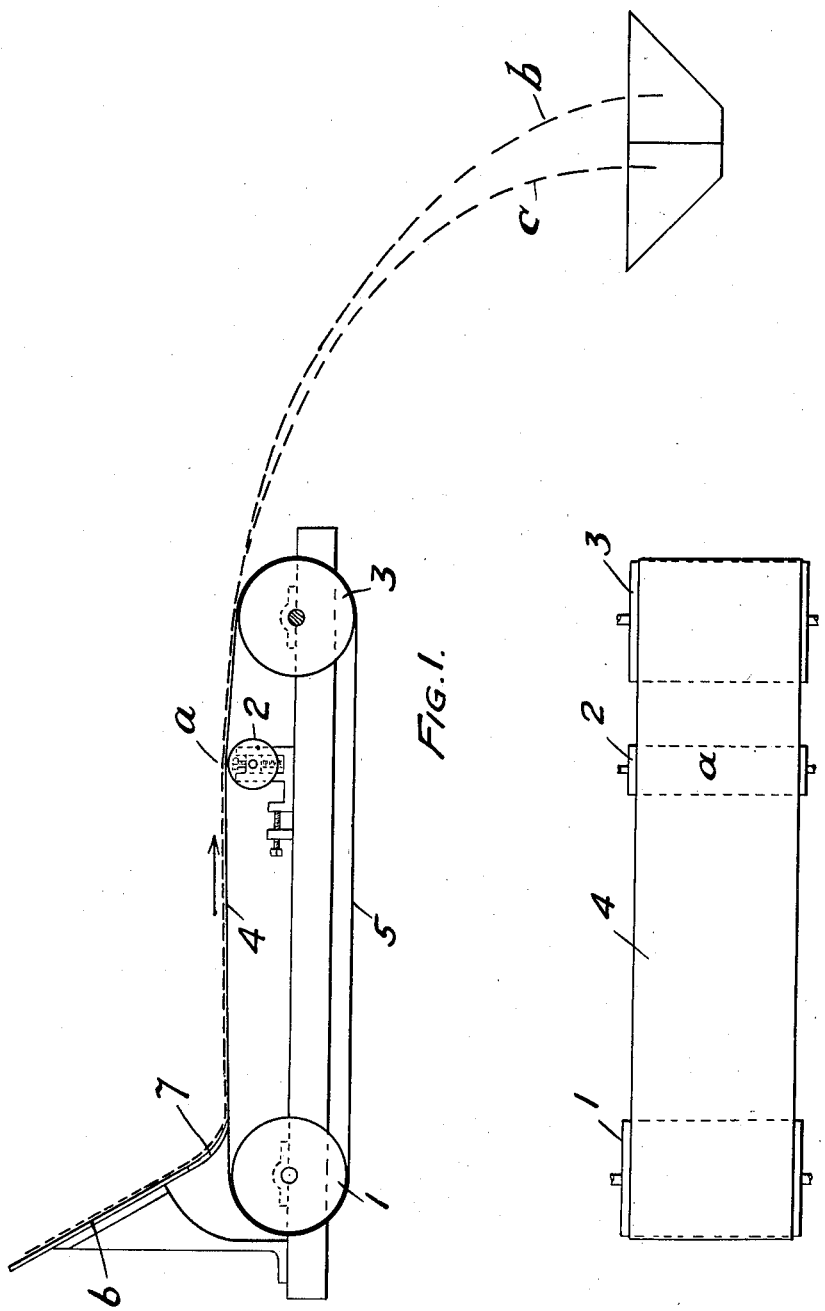
INVENTOR
Thomas F. Downing, Jr.
BY
Augustus B. Stoughton
ATTORNEY.
WITNESS:
Rob'r P. Mitchel.

Patented Aug. 20, 1940

2,212,265

UNITED STATES PATENT OFFICE 2,212,265

SEPARATION OF BODIES OF DIFFERENT PHYSICAL PROPERTIES

Thomas F. Downing, Jr., Philadelphia, Pa.

Application April 1, 1938, Serial No. 199,426

3 Claims. (Cl. 209—120)

Bodies of different physical properties, more especially bodies of coal and of impurities have been separated by projecting them from the plane unobstructed surface of the flat face of a rapidly moving belt in spaced apart relation and in a single layer at the end of the belt into the air, and permitting the bodies to follow and complete their respective trajectories without substantial interference so that they land in separated relation according to their different physical characteristics, among which weight may be mentioned.

It is one object of the present invention to make the separation more positive and certain and to extend the application of the process to bodies which are not different in kind as coal and its impurities, but to bodies which are of the same kind but are different in size, weight or shape.

Other objects of the invention will appear from the following description at the end of which the invention will be claimed.

Hitherto the bodies, notwithstanding difference in their physical properties in their travel on the belt, acquired substantially the speed thereof and all left the end of the belt at substantially the speed of the belt and, therefore, at the same speed. According to the present invention the speed of some of the bodies according to their physical characteristics is retarded in respect to the speed of the belt and of the other bodies of different physical characteristics, so that the bodies leave the end of the belt at different speeds and since the difference in speed is controlled by differences in physical characteristics, such composition, weight, shape and size, as is also the length of the trajectories of the different bodies; the separation is improved and made more perfect, in so far as by the present invention the two separating tendencies are made cumulative. In this connection it may be said that in some cases the weight of the bodies is governed by their composition and in other cases the weight of the bodies is controlled by their size.

The present invention consists in retarding the speed of the lighter bodies riding on the belt in respect to the speed of the belt and of the heavier bodies riding thereon at a point far enough from the end of the belt to prevent the retarded bodies from again resuming the speed of the belt before they are projected from the end of the belt so that the bodies are projected substantially according to their physical properties and shapes, some at the speed of the belt and some at a lesser speed; the difference in speed assisting in the complete separation of the bodies substantially according to their respective physical characteristics and shapes.

The invention also comprises apparatus adapted for the practice of the invention and the invention comprises the improvements to be presently described and finally claimed.

In the following description reference will be made to the accompanying drawing forming part hereof and in which there is illustrated in Figure 1 diagrammatically an apparatus capable of use in the practice of the invention, and in Figure 2 a top or plan view of the same with parts omitted. Referring to the drawing, the drums or pulleys 1, 2 and 3 are cylindrical and the face 4 of the belt 5 which travels around them is flat, level or lane, but the belt may be inclined longitudinally. The belt, of course, is driven in any appropriate manner. 6 is a chute having a curved end 7 which serves to deliver the bodies onto the flat face 4 of the belt in spaced apart relation and in a single layer. The bodies riding on the belt acquire the speed of the belt or tend substantially to do so. The bodies are of different physical characteristics, for example they are of different weights and may be grouped accordingly.

For example, in the case of coal the latter is of certain weight and the impurities are of different weight having regard to both size and composition. In the case of other bodies the difference in weight may be due to size alone. The bodies of different physical characteristics may be assumed to be traveling at the speed of the belt and, therefore, all at the same speed as they approach the roller 2. The roller 2 is adjusted vertically and longitudinally in such a way that the following results are accomplished. The upper surface of the roller 2 is adjusted above a tangent to the upper faces of the rollers 1 and 3 and it is, therefore, a means of establishing a hump as at $a$ in the line of direction of the travel of the belt, or, in other words, the direction of travel of the belt is changed upward and downward at $a$. The result of this is that as the belt rides over the hump the lighter particles are tossed from its surface whilst the heavier bodies ride on its surface without disturbance or at any rate with comparatively little disturbance. The lighter bodies which are tossed or freed from the surface of the belt lose velocity but they again land on the belt and the roller 2 is so positioned in respect to the roller 3 that the lighter bodies, of which the speed has been retarded as described, again contact with the belt at a point or points sufficiently near to the roller 3 to insure that these bodies do not regain the velocity of the belt before they are discharged into the air. As a result the lighter bodies leave the end of the belt at slower velocity than the heavier bodies. All of the bodies complete their trajectories without interference with each other or from an outside source. Naturally the heavier bodies follow the path indicated at *b* and the lighter bodies follow the path indicated at *c* because such is the law of ballistics. This separation is accentuated and made more complete because the speed at which the lighter bodies leave the end of the belt is less than the speed at which the heavier bodies leave the end of the belt.

By cut and try adjustment of the height of the hump *a* as well as its position in respect to the discharge end of the belt, it is not only possible to grade bodies with great accuracy of different compositions, such as coal and impurities, but also to grade bodies of the same composition according to their size, such as coal freed from impurities. I have discovered that different coals require different setting of the disturbing pulley 2 for the best results, therefore it is impossible to state the exact location of that pulley.

In the description and claims the term physical characteristics is inclusive of shape, composition, or size.

It will be obvious to those skilled in the art to which the invention relates that modifications may be made in details of construction and arrangement without departing from the spirit of the invention which is not limited in respect to such matters or otherwise than as the prior art and the appended claims may require.

I claim:

1. In the method of separating bodies of different physical characteristics which consists, in impelling all of them solely by the movement and projecting them in spaced apart relation and in a single plane at the end of a rapidly moving belt and into unobstructed air space at different speeds, the step of differentially controlling the speed of the bodies in the air which consists in changing the direction of travel of the belt from a straight line to a fixed smooth curved path and back to a straight line and throwing the lighter bodies from and again onto the belt at a point near enough to its discharge end to prevent them from regaining the speed of the belt before being discharged into the air.

2. The method of separating bodies of different physical characteristics which consists in impelling them solely by the movement of and projecting them from the plane unobstructed surface of the flat face of a rapidly moving belt in spaced apart relation and in a single layer at the end of the belt into unobstructed space, and retarding the speed at which some of the bodies are projected at the end of the belt by passing the belt over a fixed hump of curved form which unseats the lighter bodies in respect to the belt with loss of velocity before they are again seated on the belt at a distance from its end insufficient for them to regain the velocity of the belt and of the heavier bodies which are not retarded on passing the hump.

3. The method of widening the separation of bodies of different physical characteristics impelled solely by riding on a rapidly moving belt and projected from the end thereof into the air, which consists in temporarily unseating the lighter of the bodies from the belt by changing the direction of its travel from a straight line to a smooth curved path and back to a straight line, thereby projecting the lighter bodies into the air at less speed than the speed of the belt and of the heavier bodies.

THOMAS F. DOWNING, Jr.